--4.2 $$$ SF
14/86 X5 RE 32,064

United States Patent [19]

Nielsen

[11] E Patent Number: Re. 32,064

[45] Reissued Date of Patent: Jan. 14, 1986

[54] ATOMIZER WHEEL FOR THE ATOMIZATION OF SUSPENSIONS OF HARD-WEARING MATERIALS

[75] Inventor: Kaj Nielsen, Bagsvaerd, Denmark

[73] Assignee: Aktieselskabet Niro Atomizer, Soborg, Denmark

[21] Appl. No.: 413,134

[22] Filed: Aug. 30, 1982

Related U.S. Patent Documents

Reissue of:

[64] Patent No.: 3,454,226
Issued: Jul. 8, 1969
Appl. No.: 536,326
Filed: Mar. 22, 1966

Which Is a Reissue of:

[64] Patent No.: Re. 29,083
Issued: Dec. 21, 1976
Appl. No.: 389,637
Filed: Aug. 21, 1973

U.S. Applications:

[63] Continuation of Ser. No. 63,356, Aug. 3, 1979, abandoned.

[30] Foreign Application Priority Data

Mar. 26, 1965 [DK] Denmark ..... 1602/65

[51] Int. Cl.[4] ..... B05B 3/10; B04B 11/00

[52] U.S. Cl. ..... 239/224; 159/4 S; 239/591

[58] Field of Search ..... 239/223, 224, 228, 600, 239/591; 233/14 R, 20 R, 20 A, 27, 28, 32, 46, 47 R, 47 A; 159/4 F, 4 S, 4 SR, 48 R, 48 L, 48.1, 48.2

[56] References Cited

U.S. PATENT DOCUMENTS

| | | | |
|---|---|---|---|
| 2,645,415 | 7/1953 | Strezynski | 233/28 |
| 2,695,748 | 11/1954 | Millard | 233/47 |
| 2,889,873 | 6/1959 | Sauter | 159/4 S |
| 2,942,998 | 6/1960 | Newcomb | 427/171 |
| 3,079,069 | 2/1963 | Thylefors | 233/46 X |
| 3,094,487 | 6/1963 | Van Arsdell | 233/46 X |
| 3,108,952 | 10/1963 | Antz | 233/14 |
| 3,228,598 | 1/1966 | Keith | 233/47 X |

OTHER PUBLICATIONS

"Peebles Spray Drying System, Bottom Drive Nozzle Type Head", Model M-13748B, Western Precipitation Co., Los Angeles, Calif.

"Spray Drying System, Norbide Nozzle Atomizer Head Details", Model M-1076-B, Western Precipitation Co., Los Angeles, Calif.

"Norbide Nozzle Atomizer Head, Size 8-6 Model M-8452-C Details", Model M-8453-A, Western Precipitation Co., Los Angeles, Calif.

"Norbide Nozzle Atomizer Head, Size 8-6 Model M-8452-C Assembly", Model M-8452C-1, Western Precipitation Co., Los Angeles, Calif.

"Spray Machine", Model C12-89037-2, Proctor and Schwartz, Inc., Philadelphia, Pa.

*Primary Examiner*—Andres Kashnikow
*Attorney, Agent, or Firm*—Stevens, Davis, Miller & Mosher

[57] ABSTRACT

An atomizer wheel comprising an annular chamber provided with a number of conical outlet holes lined with bushings extending a distance into the chamber.

16 Claims, 4 Drawing Figures

ATOMIZER WHEEL FOR THE ATOMIZATION OF SUSPENSIONS OF HARD-WEARING MATERIALS

Figure 1:
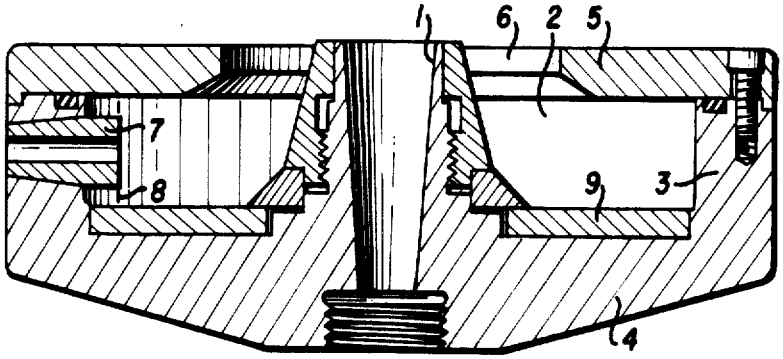

Matter enclosed in heavy brackets [ ] appears in the original patent but forms no part of this reissue specification; matter printed in italics indicates the additions made by reissue.

This is a continuation of application Ser. No. 63,356 filed Aug. 3, 1979, now abandoned which in turn is a Reissue application of Ser. No. 389,637 filed Mar. 22, 1966, now U.S. Pat. No. Re. 29,083 which in turn is a Reissue of Ser. No. 536,326 filed Mar. 22, 1966, now U.S. Pat. No. 3,454,226.

This invention relates to an atomizer wheel for the atomization of suspensions of hard-wearing materials and of the type which concentrically with the hub of the wheel has an annular bowl-shaped space in the substantially cylindrical outer wall of which there are provided a plurality of discharge openings having linings of a wear-resistant sintered material.

In this case "sintered material" means a material where the hard grains are stably interconnected no matter whether such interconnection has been effected by fusing together the surfaces of the grains or by embedding the grains in some basic substance such as, by way of example, is being used in the manufacture of wolfram carbide bodies.

In the atomization of suspensions which contain solid particles of a hard material, especially sharp edged particles, for example a suspension of ceramic clay, a very hard [[water]] wear is taking place on account of the very high velocities of discharge from the atomizer wheel caused by the centrifugal force. Thus, a conventional atomizer wheel made of the commonly used wear-resistant types of steel, will have an extremely short lifetime, sometimes only a few hours or even less before they have become so heavily worn as to be entirely unserviceable.

With a view to reducing the wear it is known to employ wear-resistant sintered materials in such places where the wear occurs.

On account of their hardness such sintered materials are practically speaking not machinable so that the wear-resistant parts to be used must be produced in their final shape by sintering which in conjunction with the circumstance that they do in all essentials only withstand compressive forces and must not, on account of their brittleness, be exposed to tensile or bending stresses of significance, has the effect that they only lend themselves to be produced in very simple geometric shapes.

There is known an atomizer wheel of the type concerned having slot discharge openings where plates of such sintered material are inserted into the slot openings at the walls thereof across which the discharge is taking place. The plates are loosely disposed for the very reason of avoiding bending stresses and are retained by their end edges engaging a projecting edge provided at the external opening of the slot, against which latter edge they are firmly pressed by the centrifugal force during rotation of the wheel. This measure prolongs the lifetime of the wheel to some extent but it proves in practice that this is nevertheless only a rather limited improvement in that the liquid is by the centrifugal force pressed in between the loosely deposited plates and the adjoining surface of the wheel proper whereby the material of the wheel is quickly worn to such extent as to make the wheel discardable.

Instead of the slot openings one has tried to use cylindrical holes in which there are disposed bushings of a wear-resistant sintered material but in this case it proves that the outer wall of the wheel is worn in the area surrounding the bushings so that the wheel is discardable after a few hours of operation so that practically no improvement is obtained by using the wear-resistant bushings.

The invention has for its object to provide an atomizer wheel of the type concerned in connection with which a very considerable increase of the lifetime is obtained. One object of the invention is to provide the holes with linings of tapered bushings of wear-resistant sintered material, projecting into the bowl-shaped space.

As a consequence of the tapered shape of the bushings they are during operation of the wheel pressed firmly against the correspondingly shaped wall surfaces of the openings by the centrifugal force so that any discharge of liquid between the bushings and the material of the wheel proper is avoided. As the bushings extend a distance into the annular space in the wheel, a layer of liquid will deposit on the outer wall during the rotation of the wheel. Owing to the centrifugal forces the heavier parts of the layer i.e. the suspended solid material is separated from the liquid in the layer and deposited directly on the wall so as to fill the area surrounding the inwardly extending portions of the bushings. The coating thus obtained is, to be sure, not wear-resistant in the proper sense of the word in that it consists of loosely interconnected particles which are incessantly torn way from the surface of the layer by the suspension flowing towards the openings of the bushings but the centrifugation of particles out into said layer will continuously have the effect that the torn-away particles are replaced by fresh particles so that the parts of the coating adjoining the wall are preserved and preclude any wear of said wall. In practice it proves that in this way lifetime can increase several hundred times.

Although the bushings consist of the said wear-resistant sintered material, they will nevertheless be subject to wear but they are readily replaceable because they are only kept in place by the centrifugal force which, as a matter of fact, is inoperative when the wheel is at rest. The wear to which the bushings are exposed is unilateral and their lifetime may, therefore, be increased by turning them gradually as they are worn.

The openings of the bushings may by way of example have a circular cross section but preferably they are of a square cross section. The square cross section determines four different well-defined positions of the bushings. Further the wearing surfaces are plane which has proved to involve a longer lifetime than curved wearing surfaces.

A wearing groove may be produced in the annular space at the place where the surface of said coating adjoins the bottom of the wheel. This wear may be essentially reduced when the bottom of the bowl-shaped space has a conical shape sloping outwardly towards the outer wall.

In a particular embodiment of the atomizer wheel according to the invention a layer of a wear-resistant material is provided on the bottom surface of the bowl-shaped space made for either in the shape of an embedded annular plate or a sintered surface coating at any rate in the outermost part of the bottom surface. In this place the wear may be less hard than in the bushings proper and through a surface coating of wear-resistant material it is possible to obtain the advantage that the lifetime of the wheel proper becomes a length sufficient for permitting the bushings being replaced a number of times before the wheel is discardable. If using an embedded ring this ring can also be replaced and, consequently, the longest imaginable lifetime of the wheel is attained.

Sometimes it may be difficult or at any rate expensive to produce the said annular plate of sintered material, but excellent results are also obtained by using a ring of a wear-resistant metal alloy because the wear at this place is, as mentioned above, less hard than in the discharge openings.

The invention will be particularly explained below with reference to the accompanying drawings.

FIG. 1 shows a sectional view an embodiment of the atomizer wheel according to the invention.

Figure 2:
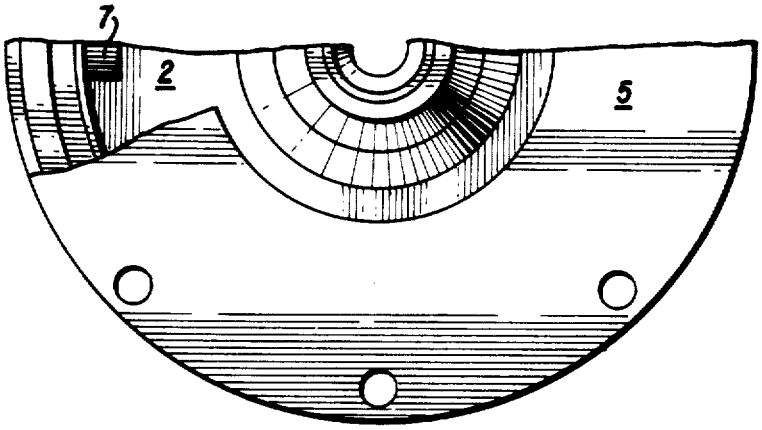

FIG. 2 the same atomizer wheel as seen from the supply side.

Figure 3:
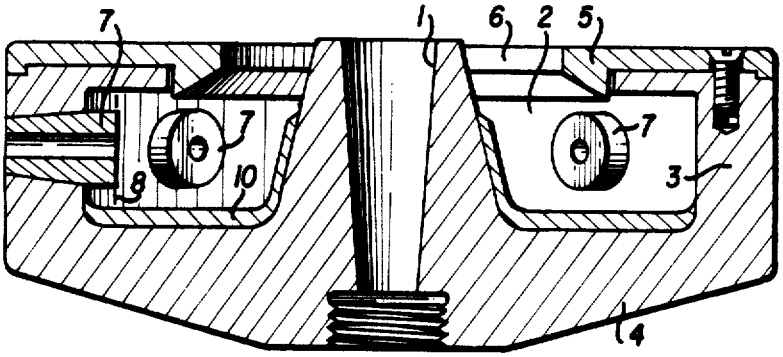

FIG. 3 shows a modified embodiment of the atomizer wheel in a sectional view.

Figure 4:
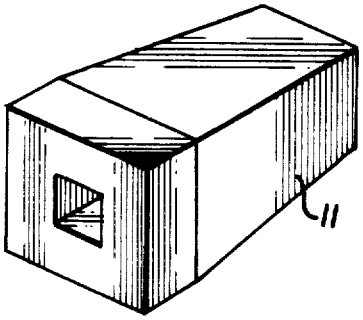

FIG. 4 a modification of a part of the atomizer wheel shown in FIGS. 1 or 3.

The wheel illustrated in FIG. 1 is substantially of bowl-shape with a centrally disposed hub 1 whereby an annular space 2 appears between the hub 1 and the outer wall 3 of the wheel which space is further defined by the wheel portion 4 connecting the hub 1 with the outer wall 3 and forming the bottom of the annular space 2. Further, an annular cover plate 5 is secured to the upper side of the wheel, said cover plate surrounding the hub 1 in such a manner as to form between said hub and the annular plate 5 an annular opening 6 leading into the space 2.

The wheel is intended for being mounted into a known spray-drying apparatus on a shaft which during operation rotates at a very high velocity, a suspension being supplied to the space through the opening 6 and precipitated in atomized form through openings in the side wall 3 to a surrounding drying chamber wherein the fine particles formed by the atomization are dried so that their contents of solid matter fall to the bottom of the drying chamber in the form of a fine powder.

FIGS. 1 and 2 show a single one of said openings, and according to the invention a bushing 7 of a wear-resistant sintered material, for example wolfram carbide, silicon carbide, aluminum oxide or tetraboron carbide, is disposed in each of said openings.

These bushings 7 have conical outer surfaces with outwardly decreasing diameter and, consequently, they can be loosely disposed in said openings as they are pressed outwardly by the centrifugal force when the wheel is rotated and, consequently, they are immovably and tightfitting secured in the openings in the outer wall.

At their outer ends the bushings 7 are preferably ground flush with the cylindrical outer surface of the wheel whilst their inwardly facing ends extend a distance into the space 2 beyond the outer wall 3 as seen in FIG. 1.

When the wheel commences to rotate the surroundings of the bushings adjoining the outer wall will very quickly be filled with a layer of the suspension as a consequence of the effect of the centrifugal force, as indicated by a dotted line 8. By the centrifuging effect the material of this layer is quickly separated so that the heavier parts, i.e. the contents of solid wearing particles will adopt [the] *an* outer position [closed] *close* to the outer wall 3, [whilst] *while* the lighter parts, i.e. the liquid will lie innermost. In this manner the surroundings of the bushings 7 are quickly filled with a layer of these solid particles which will thus protect the material of the wheel proper from wear.

A certain wearing effect may occur at the bottom of the space 2 and primarily at the vicinity of the bordering line 8 for the material deposited on the outer wall 3. For the purpose of preventing the wheel from being quickly ruined by this wearing effect, an annular plate 9 of a wear-resistant material is embedded at the bottom of the space. If deemed appropriate, this material may likewise be a hard sintered material but since this area is subject to somewhat less wear it will often suffice to use a wear-resistant metal alloy, for example a wear-resistant type of steel.

The embodiment shown in FIG. 3 differs from that shown in FIG. 1 in that instead of the annular plate 9 a layer 10 of a wear-resistant material has been applied to the bottom of the space 2, said layer extending a distance upwardly along the hub 1. Since the said layer is not replaceable in the same manner as that used in FIG. 1, it may be expedient that said layer consists of a wear-resistant sintered material.

FIG. 4 shows a modified embodiment of the bushings having square cross-section instead of circular cross-section as shown in FIGS. 1 and 3. The bushings are tapered at least over part of its length 11 corresponding to the conical part of the bushings 7 in FIGS. 1 and 3.

The bottom of the annular space may be conically sloping outwards from the hub 1 [[as indicated in FIG. 1 by means of a dotted line 12]].

I claim:

[[1. An atomizer wheel comprising a hub, an outer wall part coaxially disposed about said hub and a bottom part connecting said outer wall part with said hub, said outer wall part, said hub, and said bottom part defining between them an annular chamber, a ring-shaped cover member detachably connected to said outer wall part, said cover member having an inner circumference defining together with said hub an unobstructed space in communication with said annular chamber, said outer wall part being provided with a plurality of regularly shaped holes uniformly distributed around the circumference of the outer wall part, said holes forming the only outlet openings of the wheel, each of said holes being lined with bushing of wear-resistant sintered material, said holes and said bushings being tapered in direction radially outwardly from said chamber, the inner end of each of said bushings projecting into said chamber while their outer ends are substantially flush with the outside of said outer wall part.]]

2. An atomizer wheel as claimed in claim [[1]] 12, wherein said bushings have circular cross-sections.

3. An atomizer wheel as claimed in claim [[1]] 12, wherein said bushings have square shaped cross-sections.

[[4. An atomizer wheel as claimed in claim 1, wherein a plate of wear-resistant material is embedded in the surface of said bottom part, facing said annular chamber.]]

[[5. An atomizer wheel as claimed in claim 1, wherein said bottom part has a sintered wear-resistant surface coating facing said annular chamber.]]

[[6. An atomizer wheel as claimed in claim 1, wherein said bottom part has a conical surface sloping outwards from said hub within said annular chamber.]]

[[7. An atomizer wheel comprising a hub, an outer wall member coaxially disposed about said hub, a bottom member connecting said outer wall member with said hub, the upper surface of said bottom member being of a wear-resistant material, said outer wall member, said hub, and said bottom member defining between them an annular chamber, a ring-shaped cover member detachably connected to said outer wall member, said cover member having an inner circumference defining, together with said hub, an inlet opening in communication with said annular chamber, said outer wall member being provided with a plurality of uniform outlet openings uniformly distributed about the periphery of the outer wall part and forming the only outlet openings of said wheel, and a bushing of wear-resistant sintered material extending radially through each opening and projecting into said chamber, said hole, and said bushings being tapered in a direction radially outward from said chamber.]]

*8. The atomizer wheel of claim* [[*1*]] 12 *in which each of the holes is tapered over its entire length.*

*9. The atomizer wheel of claim 8 in which the portion of the bushing corresponding to the tapered portion of the hole is correspondingly externally tapered in the outward direction.*

*10. The atomizer wheel of claim* [[*1*]] 12 *in which the taper of the bushing extends from the outer end thereof.*

*11. The atomizer wheel of claim* [[*1*]] 12 *in which the inner end of each bushing projects into the chamber without contact with the inside of the outer wall part of the wheel.*

12. An atomizer wheel for the atomization of suspension of abrasive materials, comprising a hub, an outer wall part coaxially disposed about said hub and a bottom part connecting said outer wall part with said hub, a ring-shaped cover member detachably connected to said outer wall part, said outer wall part, said hub, said cover member and said bottom part defining between them a toroidal chamber, said cover member having an inner circumference defining together with said hub an unobstructed annular space in communication with said toroidal chamber, said outer wall part being provided with a plurality of regularly shaped holes uniformly distributed around the circumference of the outer wall part, said holes forming the only outlet openings of the wheel, each of said holes being lined with a bushing of wear-resistant sintered material, said holes and said bushings being tapered in direction radially outwardly from said chamber, the inner end of each of said bushings projecting into said chamber while their outer ends are substantially flush with the outside of said outer wall part and an annular plate of wear-resistant material embedded in and clamped against the surface of said bottom part, facing said toroidal chamber.

13. An atomizer wheel for atomization of a suspension of abrasive materials, comprising an upstanding hub, an outer wall member coaxially disposed about said hub, a bottom member connecting said outer wall member with said hub, the upper surface of said bottom member being of a wear-resistant material, a ring-shaped cover member detachably connected to the upper edge of said outer wall, said hub extending upwardly at least to the level of said cover member, said outer wall member, said hub, said cover member and said bottom member defining between them a toroidal chamber, said cover member having an inner circumference defining, together with said hub, an annular inlet opening in communication with said toroidal chamber, said outer wall member being provided with a plurality of uniform outlet openings uniformly distributed about the periphery of the outer wall part and forming the only outlet openings of said wheel, and a bushing of wear-resistant sintered material extending radially through each opening and projecting into said chamber, said holes and said bushings being tapered in a direction radially outward from said chamber.

14. An atomizer wheel for atomization of a suspension of abrasive materials, comprising a hub, an outer wall part coaxially disposed about said hub and a bottom part connecting said outer wall part with said hub, a ring shaped cover member detachably connected to said outer wall part, said outer wall part, said hub, said cover member and said bottom part defining between them a toroidal chamber, said cover member having an inner circumference defining together with said hub an unobstructed annular space in communication with said toroidal chamber, said outer wall part being provided with a plurality of regularly shaped holes uniformly distributed around the circumference of the outer wall part, said holes forming the only outlet openings of the wheel, each of said holes being lined with a bushing of wear-resistant sintered material, said holes and said bushings being tapered in direction radially outwardly from said chamber, the inner end of each of said bushings projecting into said chamber while their outer ends are substantially flush with the outside of said outer wall part, said bottom part having a sintered wear-resistant surface coating facing said toroidal chamber.

15. The atomizer wheel of claim 13 in which each of said bushings is of a single piece wear resistant sintered material having a smooth outer wall free of outwardly extending protrusions or flanges.

16. The atomizer wheel of claim 13 in which the wear resistant material on the upper surface of the bottom member extends continuously thereover and upwardly along part of the height of the peripheral surface of the hub.

17. The atomizer wheel of claim 12 in which the wear resistant material of the bottom surface is more wear resistant than the remaining surfaces of the inner toroidal chamber.

18. The atomizer wheel of claim 12 in which the toroidal chamber constitutes the entire interior volume of the atomizer wheel.

19. An atomizer wheel for atomization of a suspension of abrasive materials, comprising:

a hub having a vertical axis;

a single, unitary, cylindrical outer wall coaxially disposed about said hub and having top and bottom ends and having an inner surface and an outer surface, said inner surface having a vertical height less than the length of the axis of said hub;

a bottom part extending perpendicularly from said bottom end of said cylindrical outer wall to said hub;

a ring-shaped cover attached to said top end of said cylindrical outer wall, said cover having an outside edge and an inside edge;

said inside edge having a diameter greater than the diameter of said hub and the center of said cover being co-axial with the axis of said hub, the inside edge of said cover and hub defining between them an unobstructed annular space in communication with the interior of said atomizer wheel;

said inner surface of said cylindrical outer wall, said cover, the portion of said hub having an axis coextensive with the height of said inner surface and said bottom part defining a toroidal chamber constituting the entire interior volume of the atomizer wheel;

said cylindrical outer wall having bushing receiving holes uniformly disposed therein, each hole having an integral sidewall defining a truncated cone and having an inlet disposed along said inner surface of said outer wall and an outlet disposed along said outer surface of said outer wall, each said inlet being larger in diameter than its respective outlet;

a bushing, made of wear-resistant sintered material having a smooth outer wall free of outwardly extending protrusions or flanges inserted in each said bushing receiving hole, each said bushing having the shape of a truncated cone over its length, said shape being congruent with the shape of its respective bushing receiving hole so that the outlet end of said bushing is flush with the outer surface of said outer wall and said bushing is in contact with the sidewall of its respective hole in said outer wall for over at least half the length of said bushing, the remaining portion of said bushing extending from the inlet of said receiving hole into said toroidal chamber.

20. The atomizer wheel of claim 12 in which said wear-resistant material embedded in the surface of said bottom part facing said toroidal chamber extends continuously over said surface between said hub and said outer wall part.

21. The atomizer wheel of claim 14 in which said wear-resistant surface coating on said bottom surface extends continuously over said bottom surface between said hub and said outer wall part.

* * * * *